United States Patent Office 2,822,256
Patented Feb. 4, 1958

2,822,256

SMELTING OF ILMENITE

Gerald G. Hatch, Sorel, Quebec, and Peter J. Ensio, Saint Lambert, Montreal, Quebec, Canada, assignors to Quebec Iron and Titanium Corporation, Wilmington, Del., a corporation of Delaware No Drawing. Application March 21, 1956
Serial No. 572,792

7 Claims. (Cl. 75—7)

This invention relates to the smelting of ilmenite and, more particularly, to a method of increasing the carbon content of the metallic iron produced during the smelting of ilmenite with a solid carbonaceous reducing material.

For many decades the problems inherent in the smelting of ilmenite have both plagued and intrigued metallurgists in their efforts to commercially develop the massive deposits of ilmenite which are found throughout the world. Attention, for the most part, has been directed towards producing a marketable pig iron from the ore by conventional smelting methods, but these efforts invariably have been accompanied by a plethora of indifferent and economically unsuccessful results. The use of an excess of solid carbonaceous reducing material, to effect reduction of substantially all of the iron oxide component of the ore to metallic iron, has resulted in the formation of an exceedingly viscous titaniferous slag product in addition to the iron. In order to increase the fluidity of the viscous slag prior to tapping, the practice was either to add an extraneous fluxing material, such as lime or magnesia, or to increase the temperature sufficiently to permit liquation of the molten iron product. With either method, however, undesirable results accrued, for increasing the temperature caused an undesirable alteration in the slag chemistry and dangerously approached the critical limits of the furnace refractory, while addition of the extraneous fluxing agent diluted the slag to such an extent as to render subsequent recovery of the titanium oxide content of the slag unfeasible.

It was only as a result of the exhaustive investigations into the titanium slag concentrate, culminating in the United States patent to Peirce et al. No. 2,476,453, that a process for smelting ilmenite to recover both a molten titaniferous slag concentrate and a molten metallic iron product was made available. Representing the most modern development in the smelting of ilmenite, the practice of the method described in the patent nonetheless presented a formidable challenge when the scale of the smelting operation was greatly enlarged.

During the smelting of ilmenite with a solid carbonaceous reductant, one of the immediately pressing problems lies in the protection of the furnace from the corrosive destruction brought about by the requisite high temperatures. In order to obtain, for example, the molten titanium slag concentrate pursuant to the aforementioned Peirce et al. patent, the smelting operation requires sufficient heat to permit the molten slag concentrate to be tapped from the furnace within the temperature range of 1500° to 1700° C. Inasmuch as the temperature in the smelting zone is higher than the tapping temperature of the molten slag concentrate, there is a dangerous tendency for the molten metallic iron to diffuse through and melt the lining at the bottom of the furnace.

In order to prevent the molten iron from attacking the furnace lining, a water jacket is generally provided for the furnace. The resulting water-cooling causes the formation of a skull of solid iron on the furnace floor, and the maintenance of this skull acts to protect the lining of the furnace floor from attack by the body of molten iron thereabove. If, however, the cooling action proceeds too far, the molten iron in the smelting zone tends to freeze and thus disrupt the efficiency of the smelting operation. During normal smelting operation, the prevention of freezing requires the application of higher temperatures, which of course, causes the skull to diminish in size and counteracts the protection the skull affords to the furnace lining.

Formation of a solid iron skull protecting the furnace lining occurs when the solidification point of the molten iron is reached. The solidification point of the molten iron product is directly related to the amount of carbon dissolved in the iron; as the solubility of carbon in the iron is increased, there is a resultant lowering of the solidification point of the iron. Not only does this increased carbon content manifest itself by lowering the solidification point, but it facilitates the subsequent handling of the molten iron and increases the marketability of the pig iron product.

We have now developed a method for increasing the carbon content of the molten metallic iron produced during the smelting of ilmenite with a solid carbonaceous reducing material. Our new method resulted from our discovery that when the indigenous sulphur content of the ore is lowered prior to admixing the ore with the solid carbonaceous reductant, and when the desulphurized ore is smelted with an amount of the carbonaceous reductant slightly less than that theoretically required to reduce all of the iron oxide compound of the ore to a carbon-containing metallic iron product, the resulting metallic iron product possesses an increased carbon content, and hence exhibits a lower solidification point, than that which could be obtained heretofore.

By increasing the carbon content of the molten iron product of the smelting operation pursuant to the method of our invention, and thereby diminishing the solidification point of the molten iron, two alternative choices of smelting conditions are permitted. In the first, smelting may be carried out at the normally high temperature while concurrently increasing the rate of water-cooling of the furnace bed; in this manner advantage may be taken of the increased rate of reduction at higher temperatures, while still maintaining the advantage of a protective skull of solid iron formed on the furnace lining at lower temperatures. Thus, by increasing the temperature gradient between the solidification point at which the skull occurs and the smelting temperature, we have found that both an unusually efficient operation together with increased through-put of the furnace are obtained. Alternatively, the smelting temperature may be lowered, for a decrease in the melting point of the molten iron requires less heat to effect reduction of the ore. Hence, under either of these alternative smelting conditions, beneficial results are obtained.

To increase the carbon content of the molten metallic iron, pursuant to our invention, ilmenite ore is first subjected to a desulphurization treatment prior to admixture with the solid carbonaceous reductant, so that the resulting mixture of desulphurized ore and carbonaceous material can be readily smelted with a significant lowering of the amount of sulphur present in the molten metallic iron product of the smelting operation. As the sulphur content of the iron is decreased, the solubility of carbon in iron is increased with a resultant decrease in the solidification point of the iron.

Chemical analyses of the indigenous sulphur content of ilmenite indicate that the sulphur is primarily present in the form of mineral sulphides. The intimate association of the sulphides with the ilmenite necessitates comminuting the ore prior to physical separation of the sulphides by one of several techniques. Removal of the mineral sulphides by flotation requires fine grinding of the ore to increase the efficiency by which the sulphydric collector may form a hydrocarbon-like surface on the mineral sulphide particles in an aqueous pulp. Although any of the conventional sulphydric collectors may be used, we have found it especially advantageous to utilize sodium ethyl xanthate in a slightly acidic medium, since flotation of mineral sulphides in an acid medium is unusually efficient. The sulphydric collector may be used in conjunction with a frothing agent, such as steam-distilled pine oil, but we have found that desulphurization of the ore proceeds with equal facility in the absence of such a frothing agent.

The presence of small quantities of magnetite in raw ilmenite causes the ore to exhibit weakly magnetic properties, and therefore high-energy magnetic separation is also feasible for effecting the removal of the mineral sulphides from the balance of the ore. The requirements for comminution of the ore are not as stringent for magnetic separation as for flotation separation, but nevertheless the ore must be broken down sufficiently to insure liberation of the mineral sulphide from the other mineral components and the gangue. Upon subjecting the suitably comminuted ore to a high-intensity magnetic field, the weakly magnetic ilmenite is retained and the mineral sulphides and the gangue, which in Allard Lake ilmenite is a field rock called "anorthosite," are removed as tailings.

Removal of the mineral sulphides may also be effected by chemical treatment of the raw ilmenite. Thus, roasting the ilmenite ore causes the sulphide to be oxidized and be evolved as gaseous sulphur dioxide.

Regardless of the procedure used to effect desulphurization of the ilmenite ore, the desulphurized ore can be smelted with a minimum amount of solid carbonaceous material, as practiced in the aforementioned Peirce et al. patent, to still obtain the advantageously high carbon content in the metallic iron product of the smelting operation. The amount of coal included in the charge mix is slightly less (generally about 10% less) than the theoretical amount required to reduce the iron oxide in the ore to metallic iron with oxidation of carbon to carbon monoxide and to carburize the metallic iron product, which may contain from 1 to 3% carbon. The actual weight of coal included in the charge mix will depend, of course, upon the grade of the coal, that is, its available carbon content. A high grade coal is desirable, since the ash content of the coal enters and hence dilutes the slag.

The smelting conditions which produce a high carbon-content iron product pursuant to our invention are advantageously, but not necessarily, those set forth in the aforementioned Peirce et al. patent. These smelting conditions, in addition to the high carbon iron product, will produce a titaniferous slag concentrate characterized, as described in the patent, by ready digestibility in sulphuric acid and a high degree of extraction of its titanium content. However, when the slag concentrate is not to be used as a source of titanium dioxide (in which event the digestibility in acid and extraction of its titanum content are important) but is to be treated in a different manner, such as chlorination, additional variations in the charge composition may be used. However, the charge composition must include the desulphurized ilmenite and the aforementioned proportion of carbonaceous reductant in order to obtain the relatively high carbon-content metallic iron product obtainable by the method of our invention.

Regardless of any variations in the charge composition other than significant desulphurization of the ore and the use of slightly less than "theory" carbon, as defined hereinbefore, the only further requirement for the practice of our invention is that this charge be heated to a temperature sufficiently high to effect smelting of the ore. An electric arc furnace is presently preferred for this purpose, but reverberatory furnace smelting is also effective. The smelting temperature is advantageously carried out within the range of 1500° to 1700° C., although, as pointed out hereinbefore, a somewhat lower smelting temperature is made possible by the relatively high carbon content of the metallic iron product obtained pursuant to our invention. Under any of these smelting conditions, the products of the smelting treatments will be a molten titaniferous slag concentrate and a molten metallic iron characterized by a higher carbon content than could otherwise be obtained without desulphurization of the ore. These two products are separately accumulated in the smelting furnace, the slag floating on the iron, and are separately recoverable by conventional tapping procedure.

The following specific examples are illustrative of the practice of the invention:

EXAMPLE I

Raw ilmenite ore, analyzing at 89 grade (i. e., the sum of both the titanium oxide and the iron oxide is 89 percent by weight), was wet-ground in a ball mill to a particle size distribution of approximately 100-mesh (Tyler Standard). Sufficient water was added to the ground ore to make a pulp density of about 35 percent, and the pH then adjusted to about 6 to 6.5 by the addition of sulphuric acid. Following the addition of 0.25 pound per ton of ore of potassium amyl xanthate (Xanthate Z. 6) and 0.25 pound per ton of ore of pine oil, the resultant mixture was vigorously aerated and agitated in a series of Fagergren flotation cells.

The desulphurized ilmenite fraction, constituting about 85 percent by weight of the original raw ore, was removed as tailings, while the sulphoxy concentrate, comprising the remaining 5 percent, floated to the top of the cell and was withdrawn in the froth. The following table illustrates the change in sulphur content occurring as a result of removing the sulphides by froth flotation:

Table I

|  | Sulphur (Percent) | Weight Distribution of the Ore (Percent) | Sulphur Distribution (Percent) |
| --- | --- | --- | --- |
| Raw Ilmenite Ore | 0.334 | 100.0 | 100.0 |
| Ilmenite Fraction | 0.027 | 94.9 | 7.6 |
| Sulphide Fraction | 6.16 | 5.1 | 92.4 |

Upon smelting the desulphurized ore, using 14.5 parts of coal per 100 parts of ore, an improvement was observed in the carbon content of the desulphurized ore relative to the carbon content of a corresponding raw ore charge. Analysis of the slag concentrate showed a titanium dioxide content of 70.5 percent and a ferrous oxide content (calculated as Fe) of 9.5 percent. In the metallic iron product, the carbon content was found to be 1.8 percent, with a sulphur content of only 0.22 percent. By way of contrast, smelting of a raw ore charge under identical smelting conditions gave a metallic iron product having a carbon content of about 1 percent and a sulphur content of 0.56 percent. Thus the molten iron obtained by smelting the desulphurized ore not only contains less sulphur, which is beneficial in the subsequent desulphurization procedure, but also possesses an increased fluidity and a lower solidification point due to the higher carbon content.

By using a gravity separator in conjunction with froth flotation, the efficiency of the desulphurization is further improved, thereby resulting in a proportional increase in the carbon content of the metallic iron product from smelting beneficiated ore. Thus, when raw ilmenite is initially separated in a gravity separator, such as a Dutch State cyclone, and the heavy ilmenite fraction then desulphurized by froth flotation, smelting of the desulphurized fraction results in a metallic iron product having a carbon content as high as 2 to 3 percent, depending upon the smelting conditions followed.

In both cases, the froth flotation is advantageously carried out under slightly acidic conditions, for the sulphydric collector functions without specificity in the flotation of mineral sulphides in an acid medium. Inasmuch as the froth flotation is predicated on maximum removal of the sulphides contained in raw ilmenite, without regard to specific sulphides, the commonly available sulphydric collectors, such as the sodium or potassium alkyl xanthates, the sodium or ammonium dialkyl dithiophosphates, as well as the alkyl and aryl mercaptans, may be used advantageously.

EXAMPLE II

Raw ilmenite ore, analyzing at 89 grade and having weakly ferro-magnetic properties, was comminuted to a particle size distribution of about 65-mesh (Tyler Standard) thereby loosening the mineral sulphides associated with the ilmenite. After subjecting the ground ore to high-intensity magnetic separation, approximately 88 percent by weight of the ore was recovered in the magnetic concentrate.

Smelting of the magnetic fraction, using 11 pounds of coal to 100 parts of ore, was accomplished in an electric arc furnace. Analysis of the tapped slag concentrate showed a titanium oxide content of 75.0 percent, and a ferrous oxide content (calculated as Fe) of 5.0 percent. The metallic iron product had a carbon content of 1.6 percent and a sulphur content of 0.16 percent. By contrast smelting of a raw ilmenite charge, gave a metallic iron product with a carbon content of 1.0 percent and a sulphurs content of 0.52 percent.

The use of gravity separation, followed by high-energy magnetic concentration of the heavy ilmenite fraction allows for a more thorough removal of the mineral sulphides than use of magnetic concentration alone. Upon smelting this beneficiated magnetic fraction, using the aforementioned smelting conditions, the metallic iron product possesses a carbon content of about 2 percent.

We claim:

1. The method of increasing the carbon content of the metallic iron produced during smelting of ilmenite with a solid carbonaceous reducing material which comprises desulphurizing the ore to remove at least a major portion of its indigenous sulphur content, thereafter admixing the desulphurized ore with a quantity of solid carbonaceous material slightly less than that theoretically required to reduce all of the oxidic iron component of the desulphurized ilmenite to a carbon-containing metallic iron, smelting the resulting mixture of desulphurized ore and carbonaceous material and thus producing a molten titaniferous slag concentrate and the desired molten metallic iron product.

2. The method of increasing the carbon content of the metallic iron produced during smelting of ilmenite with a solid carbonaceous reducing material which comprises comminuting ilmenite ore having an appreciable sulphide-sulphur content so as to liberate the sulfide mineral from the other components of the ore, physically separating the mineral sulphides from the ore particles, thereafter admixing the desulphurized ore with a quantity of solid carbonaceous material slightly less than that theoretically required to reduce all of the oxidic iron component of the ilmenite to metallic iron, smelting the resulting mixture of desulphurized ore and carbonaceous material and thus producing a molten titaniferous slag concentrate and the desired molten metallic iron product.

3. The method of increasing the carbon content of the metallic iron produced during the smelting of ilmenite with a solid carbonaceous reducing material which comprises comminuting ilmenite ore having an appreciable sulphide-sulphur content so as to liberate the sulfide mineral from the other components of the ore, physically separating the mineral sulphides from the ore particles by flotation using at least one sulphydric collector, thereafter admixing the desulphurized ore with a quantity of solid carbonaceous material slightly less than that theoretically required to reduce all of the oxidic iron component of the ilmenite to metallic iron, smelting the resulting mixture of desulphurized ore and carbonaceous material and thus producing a molten titaniferous slag concentrate and the desired molten metallic iron product.

4. The method of increasing the carbon content of the metallic iron produced during the smelting of ilmenite ore with a solid carbonaceous reducing material which comprises comminuting ilmenite ore having an appreciable sulphide-sulphur content and weakly ferro-magnetic properties so as to liberate the sulfide mineral from the other components of the ore, physically separating the mineral sulphides from the weakly magnetic ore particles by high-energy magnetic separation, thereafter admixing the desulphurized ore with a quantity of solid carbonaceous material slightly less than that theoretically required to reduce all of the oxidic iron component of the ilmenite to metallic iron, smelting the resulting mixture of desulphurized ore and carbonaceous material and thus producing a molten titaniferous slag concentrate and the desired molten metallic iron product.

5. The method of increasing the carbon content of the metallic iron produced during the smelting of ilmenite with a solid carbonaceous reducing material which comprises classifying ilmenite ore having an appreciable sulphide-sulphur content into heavy and light fractions, comminuting the heavy fraction so as to liberate the sulfide mineral from the other components of the ore, physically separating the mineral sulphides from the particles of the heavy fraction, thereafter admixing the desulphurized heavy fraction with a quantity of solid carbonaceous material slightly less than that theoretically required to reduce all of the oxidic iron component of the ilmenite to metallic iron, smelting the resulting mixture of desulphurized heavy fraction and carbonaceous material and thus producing a molten titaniferous slag concentrate and the desired molten metallic iron product.

6. The method of increasing the carbon content of the metallic iron produced during the smelting of ilmenite with a solid carbonaceous reducing material which comprises classifying ilmenite ore having an appreciable sulphide-sulphur content into heavy and light fractions, comminuting the heavy fraction so as to liberate the sulfide mineral from the other components of the ore, physically separating the mineral sulphides from the particles of the heavy fraction by flotation using at least one sulphydric collector, thereafter admixing the desulphurized heavy fraction with a quantity of solid carbonaceous material slightly less than that theoretically required to reduce all of the oxidic iron component of the ilmenite to metallic iron, smelting the resulting mixture of desulphurized heavy fraction and carbonaceous material and thus producing a molten titaniferous slag concentrate and the desired molten metallic iron product.

7. The method of increasing the carbon content of the metallic iron produced during the smelting of ilmenite with a solid carbonaceous reducing material which comprises classifying ilmenite ore having an appreciable sulphide-sulphur content and weakly magnetic properties into heavy and light fractions, physically separating the mineral sulphides from the weakly magnetic heavy fraction by high-energy magnetic separation, thereafter admixing the desulphurixed heavy fraction with a quantity of solid carbonaceous material slightly less than that theoretically required to reduce all of the oxidic iron component of the ilmenite to metallic iron, smelting the resulting mixture of desulphurized heavy fraction and carbonaceous material and thus producing a molten titaniferous slag concentrate and the desired molten metallic iron product.

References Cited in the file of this patent

UNITED STATES PATENTS

| | | |
|---|---|---|
| 2,029,156 | Christmann et al. | Jan. 28, 1936 |
| 2,238,673 | Asak | Apr. 15, 1941 |
| 2,375,268 | Wyckoff | May 8, 1945 |
| 2,453,050 | Turbett | Nov. 2, 1948 |
| 2,476,453 | Peirce et al. | July 19, 1949 |